United States Patent [19]

Ward

[11] Patent Number: 4,643,392

[45] Date of Patent: Feb. 17, 1987

[54] VALVES

[75] Inventor: Richard Ward, Worsley, England

[73] Assignee: Dobson Park Industries Plc., Nottingham, England

[21] Appl. No.: 691,064

[22] Filed: Jan. 14, 1985

[30] Foreign Application Priority Data

Feb. 8, 1984 [GB] United Kingdom ............... 8403341

[51] Int. Cl.⁴ .................... F16K 35/00; F01B 1/00; E21D 23/12
[52] U.S. Cl. ............... 251/89; 91/170 MP; 137/637.1; 137/625.42; 251/90; 405/302
[58] Field of Search ............ 251/89, 90; 91/170 MP, 91/182, 184, 191, 195; 137/635, 636, 636.3, 595, 601, 343, 637.2, 637.1, 637; 405/302, 289, 299–301

[56] References Cited

U.S. PATENT DOCUMENTS

| | | | |
|---|---|---|---|
| 3,063,468 | 11/1962 | Dufour | 137/625.42 X |
| 3,147,769 | 9/1984 | Benton et al. | 251/89 X |
| 3,434,389 | 3/1969 | Grisebach | 405/299 X |
| 3,564,974 | 2/1971 | Painter | 91/170 MP X |
| 3,638,531 | 2/1972 | Rieschel et al. | 405/301 X |
| 3,963,051 | 6/1976 | Kuhlmann | 251/89 X |
| 4,050,256 | 9/1977 | Phillips et al. | 405/299 |
| 4,095,616 | 6/1978 | Krieger | 91/170 MP X |
| 4,155,375 | 5/1979 | Krieger et al. | 91/170 MP X |
| 4,158,326 | 6/1979 | Krieger | 405/302 X |
| 4,182,585 | 1/1980 | Krieger | 405/302 |
| 4,346,701 | 8/1982 | Richards | 137/637.1 X |

Primary Examiner—Larry Jones
Attorney, Agent, or Firm—Murray and Whisenhunt

[57] ABSTRACT

A valve for use in controlling a plurality of fluid operated functions, for example the functions of a hydraulic mine roof support, comprises a valve body 10, a plurality of valve members 13 each movable independently to carry out a fluid flow control function, a plurality of valve actuating members 21, movable in a direction tending to actuate the valve members 13, and an interposer device 25 movable to prevent at least one of the valve actuating members 21 from actuating its associated valve member 13, thus enabling the valves to be selectively operable.

21 Claims, 5 Drawing Figures

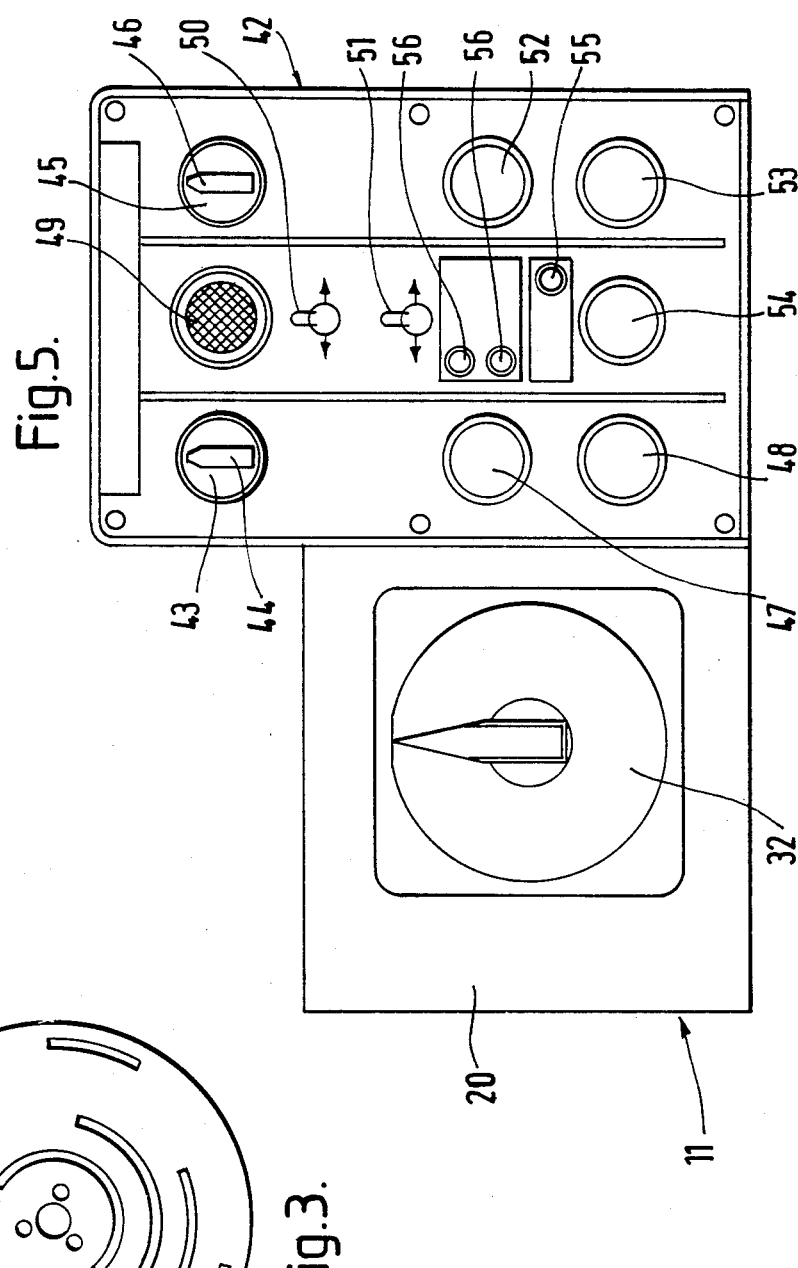
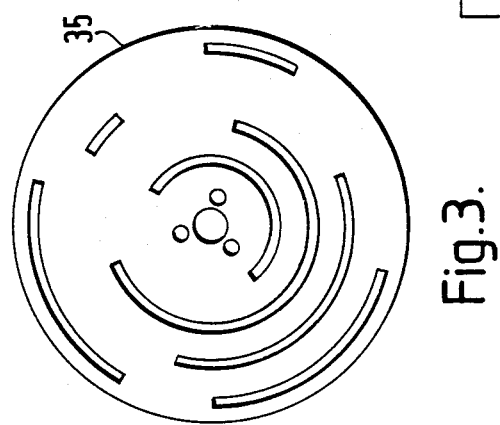

VALVES

BACKGROUND TO THE INVENTION

The invention relates to valves, and particularly, though not exclusively, to valves for use in controlling the functions of mine roof supports.

The operations of a modern hydraulic mine roof support involves the carrying out of a number of different functions such as the extension of a ram to push a coal conveyor away from a support into a newly cut part of a coal seam, the retraction of hydraulic legs of the support to free the support from the mine roof, the retraction of the said ram to draw the support up to the newly positioned conveyor, and the extension of the legs to reset the support to the mine roof.

DESCRIPTION OF THE PRIOR ART

Various types of valve are known for controlling the flow of hydraulic fluid required for these functions and some known valves are described in our U.K. Patent Specification No. 2095425 and U.K. Patent Application No. 8316838.

OBJECT OF THE INVENTION

It is an object of the present invention to provide an improved valve suitable for controlling the functions of an hydraulic mine roof support.

SUMMARY OF THE INVENTION

The invention provides a valve for use in controlling a plurality of fluid operated functions, the valve comprising a valve body, a plurality of valve members each movable independently to carry out a fluid flow control function, a plurality of valve actuating members movable in a direction tending to actuate the valve members, and an interposer device movable to prevent at least one of the valve actuating members from actuating its associated valve, thus enabling the valves to be selectively operable.

The valves may be positioned in a circle, the interposer device comprising an interposer disc.

The valve actuating members may comprise fluid operated rams.

The interposer disc may have a rim, against which the fluid operated rams may brear, the rim being connected to a hub by flexible spokes.

The rim of the disc is preferably interrupted at at least one location to permit one or more rams to move past the disc to actuate their associate valves.

The disc rim may be interrupted by providing a recess in the rim of the disc.

Preferably the dimensions of the recess are related to the positions of the rams such that in the majority of positions of the disc only one selected ram can move past the disc but in at least one position of the disc two or more rams can move past the disc.

There may for example be ten valves and twelve selective positions of the disc such that in ten positions of the disc only one ram can move past the disc and in the other two positions of the disc two rams can move past the disc.

Preferably the disc has a home position but can be rotated through not more than 360° to other desired positions against the action of a return spring.

There may be manual means for rotating the disc.

It is preferred that alternatively or in addition there are electrical means for rotating the disc.

The electrical means may comprise an electric motor.

The disc may be associated with code means to generate a code related to the position of the disc.

There may be control means operable to generate a code related to a desired position of the disc.

There may be comparator means arrangeable to stop the motor when the code generated by the control means corresponds to the code generated by the code means.

Preferably the code means comprises a code disc movable between an array of light emitting diodes and a corresponding array of photo transistors.

The invention includes a mine roof support fitted with a valve according to the invention.

The valve fitted to the mine roof support may be associated with electrical control means arranged at a remote point, for example on another mine roof support or at the end of a mine face.

The code generation means may be situated on an adjacent mine roof support or other remote position such that the operator of the mine roof support being activated is located in a place of safety, i.e. under the protection of an adjacent mine roof support.

As an integral part of the code generation means, there may be a "dead man" device which upon being released prevents instantly further operation of the activated support; on one or more functions.

A further requirement at the code generation means may be satisfied by the provision of a "dead man" option or override on one or more functions, e.g. coal conveyor push.

The supports embodying the valves may be operated on unit, adjacent or bank control systems, i.e. individually, from an adjacent support, or in batches where completion of the operating sequence on one support initiates the operation of the next support in the sequence. Further objects and advantages of the invention will become apparent from the following description of a specific embodiment of the invention, given by way of example.

DESCRIPTION OF THE DRAWINGS

FIG. 3 is a plan view of a code wheel of the valve shown in FIG. 1;

FIG. 5 is a front view of the valve fitted with electrical controls for controlling adjacent roof supports.

DESCRIPTION OF THE EMBODIMENT

Figure 1:
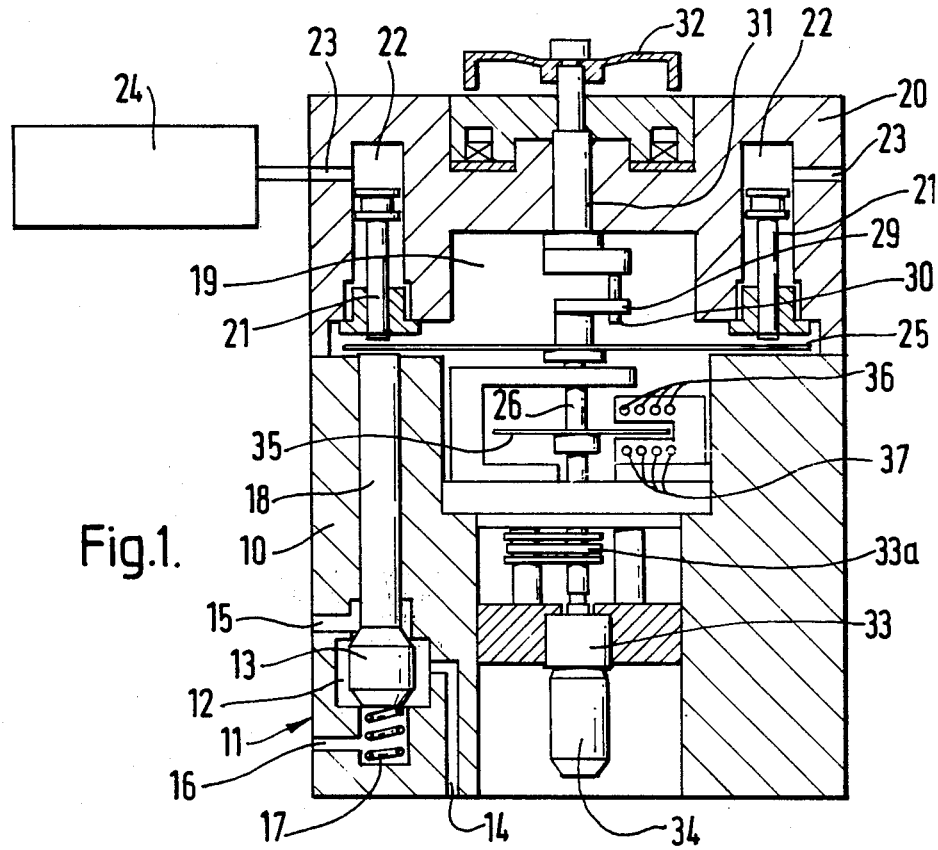
FIG. 1 is a diagrammatic sectional view of an embodiment of valve according to the invention.

The valve of FIG. 1 comprises a generally cylindrical body 10 around which ten separate valves are arranged, only one valve 11 being illustrated in FIG. 1 for the sake of simplicity. Each valve has a valve chamber 12 in which is slidably mounted a valve member 13. An axially extending control port 14 communicates with the valve chamber 12. A radial hydraulic supply port 15 is capable of communicating with the upper portion of the valve chamber 12 and a hydraulic exhaust port 16, which also extends radially, is capable of communicating with the lower end of the valve chamber 12.

The valve member 13 has tapered ends as shown and a compression spring 17 normally biases the valve member 13 into the position shown in which the supply port 15 cannot communicate with the valve chamber. The exhaust port 16 is, on the other hand, in communication with the valve chamber 12, and accordingly the control port 14 is connected to exhaust.

Since there is a plurality of the valves positioned around the valve body 10, it will be appreciated that there is a plurality of inlet ports 15 and exhaust ports 16 terminating on the outer radial face of the valve body. In use a sleeve surrounds the valve body and annular galleries put all the inlet ports 15 in communication with a supply of hydraulic fluid and put all the exhaust ports 16 in communication with atmosphere. It is therefore only necessary for a single supply hose to communicate with the sleeve and a single exhaust hose.

Since the supply ports 14 extend axially, it will be appreciated that there will be a ring of ten supply port outlets terminating in the lower face of the valve body 10. A group of ten parallel control hoses can be neatly connected of these outlets.

The movement of each valve member 13 from the position shown to a second position in which the control port 14 communicates with the associated supply port 15 is controlled by means of an elongate plunger 18 and there is of course one of these plungers for each of the valves.

The upper end of each plunger 18 terminates in or slightly below a control chamber 19. Mounted in the upper part 20 of the valve body are ten operating rams 21, two of which are visible in FIG. 1. Each ram is positioned so that it is in register with one of the plungers 18 and the positions of the ten rams around the valve body are illustrated in chain lines in FIG. 2. The other end of each ram 21 projects into the control chamber 19.

The cylinder 22 of each ram 21 communicates with the periphery of the valve body via a radial passage 23. In use, when the outer sleeve is fitted over the valve body, the radial passages 23 are all interconnected with a gallery and hydraulic fluid can be applied to the gallery as desired by means of a solenoid, motorised or other type of valve 24.

Mounted in the control chamber 19 between the rams 21 and the plungers 18 is an interposer disc 25 fixedly mounted on a rotatable shaft 26. The interposer disc is shown in detail in FIG. 2 and comprises a strong stiff rim 27 connected to the shaft 26 by three spokes 28 which are flexible such as to permit the rim 27 to move in the axial direction. Mounted at the upper end of the shaft 26, above the disc 25, is a radially extending peg 29. This peg 29 is capable of engaging with an axially extending peg 30 projecting downwardly from a shaft 31 which is mounted in the upper part 20 of the valve body, co-axial with the shaft 26. The upper end of the shaft 31 carries a handle 32.

The shaft 26 is coupled via a gearbox 33 with a DC permanent magnet motor 34. Also mounted on the shaft 26 is a code wheel 35 which is shown in detail in FIG. 3. Four light emitting diodes 36 are positioned at one side of the disc 35 and four photo transistors 37 are positioned at the other side, each transistor being in register with one of the light emitting diodes.

It will be seen that the code wheel 35 has a series of arcuate slots therein and the arrangement of the slots is such that for any given position of the code wheel, the photo transistors will generate a code which is unique to that position.

Figure 4:
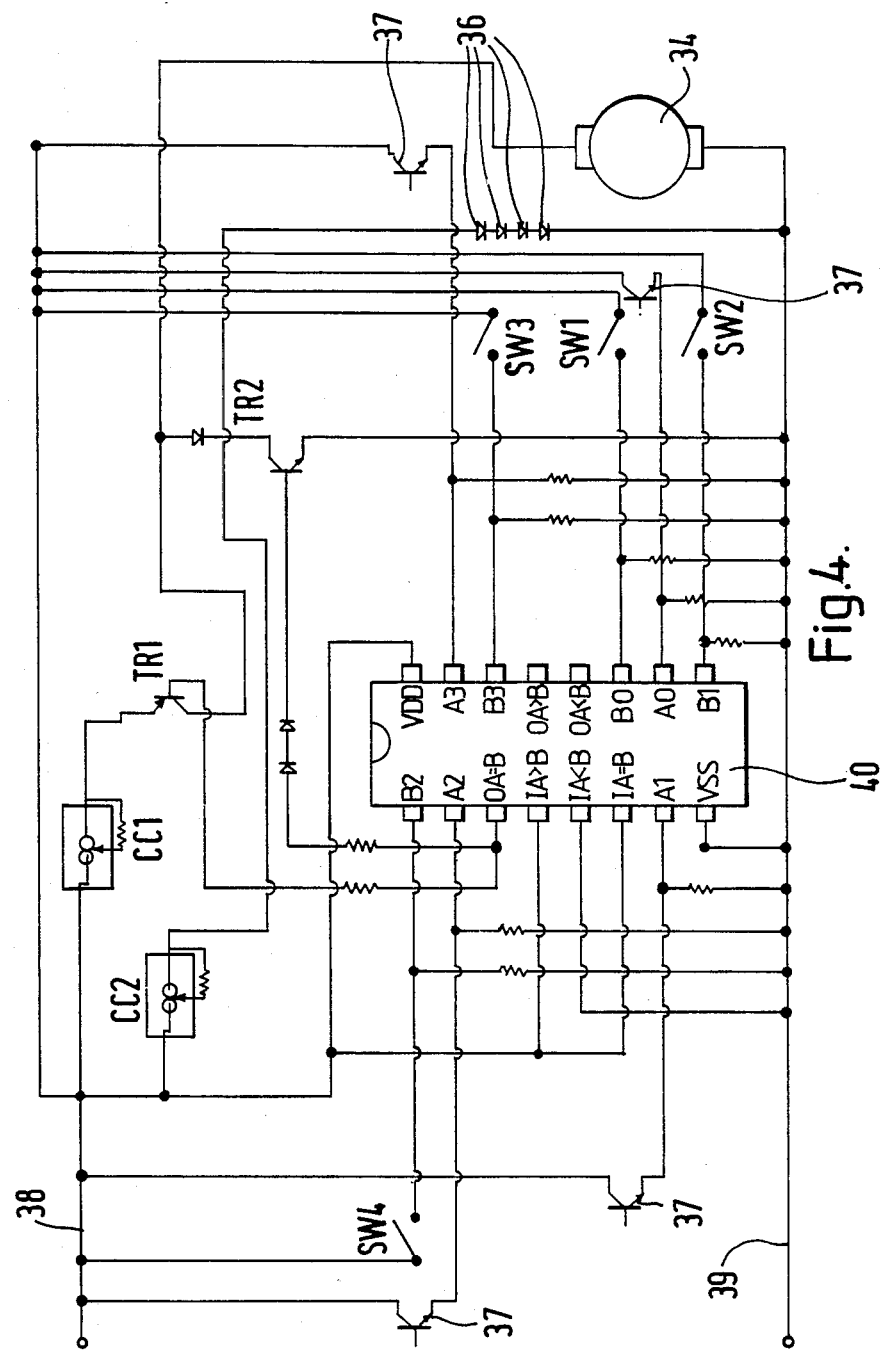
FIG. 4 is a circuit diagram relating to the electronics associated with the valve of FIG. 1.

Turning now to FIG. 4, the power supply to the motor 34 is illustrated, being derived from 12-volt positive and negative supply lines 38 and 39. There is a constant current circuit CC1 which limits the stalled torque of the motor and a transistor TR1 which can switch the motor on or off according to the signal applied to its base. The four light emitting diodes 36 are connected in series and are fed through a second constant current circuit CC2. The four photo transistors 37 are arranged as shown.

A second transistor TR2 is connected into the circuit as shown.

The circuit also includes four switches SW1 to SW4.

The circuit components are connected as shown to a comparator 40 which is a proprietory integrated circuit which need not be described in detail.

When it is is desired to control the valve from a remote source, for example from a mine roof support other than the mine roof support which is to be moved, or from some other remote point, such as a face end computer, the switches SW1 to SW4 are opened or closed according to a predesired pattern to give a binary code corresponding to the code which would be produced by the coding wheel when the interposer disc is at a position corresponding to the desired function which is to be carried out. The switches may be mechanical switches or they may comprise voltages taken from say a computer control system.

Once the switches SW1 to SW4 have been arranged according to the predesired pattern, the 12-volt positive line 38 is switched on and the motor 34 starts to turn. At the same time the light emitting diodes 36 are energised. The motor turns the interposer disc 35 from a home position to which it is biased by a constant torque return spring 33a. It also of course turns the code wheel 35.

When the code wheel reaches the angular position which causes the light emitting diodes and photo transistors to generate a code which corresponds to the code preselected on the switches, this correspondence is detected by the comparator 40. In other words the state of each pin AO to A3 of the comparator is the same as that of the corresponding pins BO to B3 and this produces an output on the pin marked OA=B. When this output appears it causes transistor TR1 to be switched off and transistor TR2 to be switched on. The switching off of transistor TR1 switches off the motor and the switching on of transistor TR2 short circuits the motor, thereby dynamically braking it and limiting the motor over-run.

Immediately the motor is switched off the motor tries to run backwards under the influence of the return spring. As soon as the motor does try to run backwards correspondence is lost in the comparator by the movement of the code wheel and the motor is immediately switched on again by transistor TR1 moving the motor forward again. This cycle is repeated at high frequency so that the interposer disc 25 is effectively stopped at the desired angular position, trembling through an insignificant angle in accordance with the switch on, switch off cycle of the motor.

The signal from pin OA=B also activates the solenoid valve 24 and so all the rams 21 are moved downwardly.

Most of the rams come into contact with the rim 27 of the interposer wheel and therefore have no effect on the associated valve plungers 18. It will however be seen from FIG. 2 that there is an arcuate recess 41 in the rim of the interposer disc and when, for example, the interposer disc is stopped at the position shown in FIG. 2, the recess 41 is in register with one of the rams 21 and so this ram is able to pass the interposer disc and depress the associated plunger 18. Thus a single selected valve is actuated to provide fluid pressure to the associated control port 14. Out of the ten valves arranged in the valve body 10, the particular valve which is selected for operation is determined by the switching arrangement selected for the switches SW1 to SW3.

Once the selected valve has been operated for the desired length of time power is switched off. The solenoid valve 24 causes the activated ram 21 to return to its original position. The associated valve returns to its original position under the action of its return spring 17, and the interposer disc 25 and associated components return to their home position under the influence of their return spring. The valve is then ready for further operation to select the same, or another valve as desired.

Figure 2:
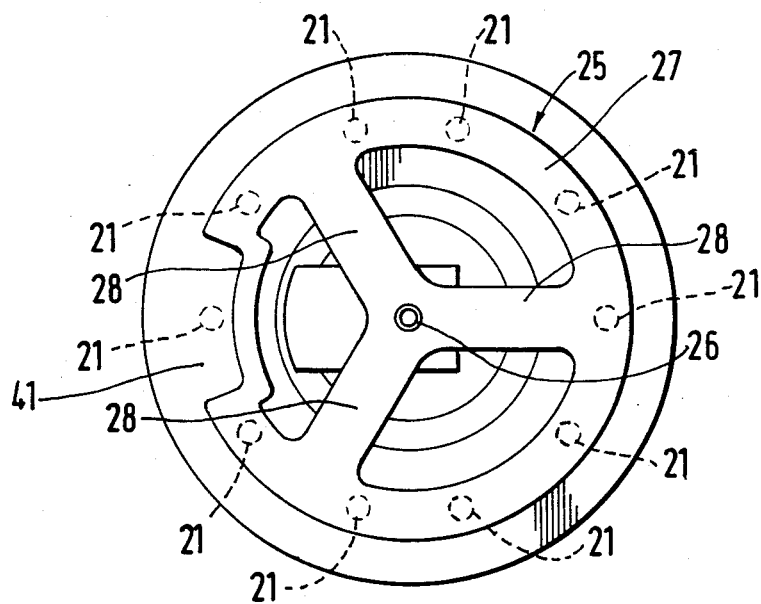
FIG. 2 is a plan view of an interposer disc of the valve shown in FIG. 1.

Under some circumstances it may be necessary to actuate two of the valves 11 simultaneously. It will thus be seen that the upper two rams 21 and the lower two rams 21, as viewed in FIG. 2, are closer together than the other plungers. The valves 11 have corresponding positions. The length of the recess 41 in the rim of the interposer disc is such that the recess can be positioned to be simultaneously in register with the upper two rams 21 or the lower two rams 21 as viewed in FIG. 2. Thus these two pairs of rams, and their associated valves, can be operated simultaneously if desired.

The valves 11 can also be operated manually if desired, using the handle 32. Because the axial pin 30 engages with the radial pin 29, rotation of the handle 32 brings about rotation of the interposer disc 25, against the action of its return spring. A switch on the same support as the valve 11 and in close proximity to the handle 32 causes the motor 34 and its associated electrical components to be switched off when the handle 32 moves from its home position. Remote or automatic operation using the electronic controls cannot occur again until the handle 32 has been returned to its home position.

During manual operation the handle 32 is used to turn the interposer disc 25 to a desired position to select a desired valve or valves and a manual switch (not shown) is then used to operate the solenoid valve 24 for the desired period of time. Alternatively, the rams 21 may be operable manually by means of a manual pilot valve (not shown).

Turning now to FIG. 5, this illustrates the valve 11 coupled to an electrical control box 42.

It is not normally desirable for all the functions of a mine roof support to be controllable from a position on that particular mine roof support itself, for safety reasons. It is preferred that the control is from a remote point, for example the end of a face, or from an adjacent support.

The electrical control box 42 can be mounted on one mine roof support and be electrically connected by simple cabling to the valves of left-hand and right-hand adjacent supports, each of these valves being substantially identical to the valve 11. For example the control box 42 has a switch 43 which is rotatable clockwise or anti-clockwise by means of a projecting lug 44. If the switch is rotated clockwise it generates a code which causes the valve 11 of the left-hand adjacent support to advance the left-hand support. If it is rotated anti-clockwise it generates a code which causes the valve 11 of the left-hand adjacent support to raise the legs of the support. A similar switch 45 with lug 46 is provided for controlling the advance and raising of the legs of the right-hand adjacent support. The switches 43 and 45 are biased into the position shown in FIG. 5 thus giving a "dead man's handle" feature.

Other switches on the control box 42 may be directly connected to the valve 11. For example the depression of a pushbutton switch 47 generates a code which is transmitted to the valve 11 causing the valve to advance a fore pole. Similarly a pushbutton switch 48 may be used to generate a code which causes the valve 11 to actuate the ram by means of which the support is connected to the coal carrying conveyor, in order to push the conveyor forward towards a newly cut mine face.

Other controls on the control box 42 include a speaker 49 which gives an audible warning when the support is about to move, an on-off switch 50 for solenoid valves, a mode switch 51 enabling the support to be controlled locally or automatically from a remote point, a start button 52, an emergency stop button 53, and an "advance enable" button 54 which has to be depressed before the support can advance, although the actual advance signal will be subsequently generated elsewhere, for safety reasons. There are also three visual warning lights, one 55 to indicate whether advance has been enabled, and two 56 to indicate whether or not the control box has accepted or rejected the command given to it.

The invention is not restricted to the details of the foregoing embodiment.

For instance instead of having separate switches such as 43 and 45 to control respectively left-hand and right-hand adjacent supports, there may be one set of control buttons for each service, e.g. "legs raise", and "support advance", and one direction control switch which can be set to cause the control buttons to control the right-hand or left-hand support as desired. The logic circuitry may be hard wired.

Alternatively, the manual selector handle 32 may be arranged so that it can be used to control the functions of the support on which it is mounted, and, selectively, the functions of the two adjacent supports. There could for example be three operating buttons marked "unit", "right" and "left" or equivalent legends, with a selector control which mechanically masked the two buttons not in use.

Alternatively a single button with a "unit", "right", "left", selector switch could be used.

In each case the need for a bulky and costly pushbutton panel could be eliminated.

During manual operation, a cam operated switch may be provided to ensure that the selector is truly "home" in a position which generates a selection code before a manual operating button is enabled to function.

The electronic circuitry may be arranged so that no current is taken until an "operate" button is pressed, thus enabling a single twelve-volt intrinsically safe supply to operate a face of any length.

Where spring loaded pushbuttons are used to provide a "dead man's handle" feature it may be necessary to provide a "lock on" device on certain selections, such as "conveyor advance". There could for example be a "hold" switch which would be effective only on the said certain selections. Alternatively there may be a "hold" button which is pressed at the same time as an "operate" button. Once the "hold" operation has been completed the "hold" button may be automatically released, or the "hold" function automatically cancelled for subsequent operations.

I claim:
1. A valve for use in controlling a plurality of fluid operated functions, said valve comprising:
   a plurality of valve means each movable independently by fluid pressure from an inoperative position to an operative position for carrying out a fluid control function, each valve means comprising a valve member and a valve actuating member, said valve means being arranged in a circle around an axis and being movable in a direction parallel to said axis;
   fluid supply means for supplying fluid simultaneously to all of said valve means; and
   an interposer means for permitting at least one of said valve means to move to said operative position in response to the supply of fluid from said fluid supply means while at the same time preventing the remaining valve means from moving to said operative position, thus enabling the valve means to be selectively operable, said interposer means including an interposer disc transversely mounted for rotation about said axis, said interposer disc being disposed between said valve actuating members and said valve members for selectively preventing said valve actuating members from actuating said valve members.

2. A valve as claimed in claim 1, in which said interposer disc has a rim against which said actuating members may bear, said rim being connected to a hub by flexing spokes.

3. A valve as claimed in claim 2, in which said rim of said disc is interrupted at at least one location to permit one or more actuating members to move past said disc to actuate their associated members.

4. A valve as claimed in claim 3, in which said rim is interrupted by providing a recess in said rim.

5. A valve as claimed in claim 4, in which said recess has dimensions related to positions of said actuating members such that, in a majority of positions of said disc, only one actuating member can move past said disc, but, in at least one position of said disc, two or more actuating members can move past said disc.

6. A valve as claimed in claim 4, in which there are ten valve members and twelve selective positions of said disc such that in ten positions of said disc only one actuating member can move past said disc and in the other two positions of the disc two actuating members can move past the disc.

7. A valve as claimed in claim 1, in which said disc has a home position associated with code means for generating a code related to the position of said disc.

8. A valve as claimed in claim 1, in which manual means are provided for rotating said disc.

9. A valve as claimed in claim 1, in which electrical means are provided for rotating said disc.

10. A valve as claimed in claim 9, in which said electrical means comprise an electric motor.

11. A valve as claimed in claim 10, in which said disc is associated with code means for generating a code related to a position of said disc.

12. A valve as claimed in claim 11, in which there are control means for generating a code related to a desired position of said disc.

13. A valve as claimed in claim 11, in which said code means comprise a code disc movable between an array of light emitting diodes and a corresponding array of phototransistors.

14. A valve as claimed in claim 12, in which there are comparator means for stopping said motor when a code generator by said control means corresponds to a code generated by said code means.

15. A mine roof support fitted with a valve as claimed in claim 12.

16. A mine roof support as claimed in claim 15, in which said control means for generating a code relative to a desired position of said disc is situated in a place of safety so that when the support is operated the operator need not be in the immediate vicinity of said support.

17. A mine roof support as claimed in claim 15, in which said control means for generating a code has a "dead man" device which, upon being released, prevents instantly further operation of an activated support, and at least one function of said support.

18. A mine roof support as claimed in claim 17, in which the "dead man" device can be over-ridden on at least one function.

19. A mine roof support fitted with a valve as claimed in claim 1.

20. A mine roof support as claimed in claim 19, in which said valve is associated with an electrical control means arranged at a remote point.

21. A plurality of mine roof supports as claimed in claim 19, the valves being arranged for operation as unit, adjacent or bank control systems, i.e., for individual support control, for control from an adjacent support, or for control in batches where completion of an operating sequence on one support initiates the operation of another support in sequence.

* * * * *